United States Patent
Mavridis et al.

(10) Patent No.: US 10,654,956 B2
(45) Date of Patent: May 19, 2020

(54) ETHYLENE ALPHA-OLEFIN COPOLYMERS AND METHODS

(71) Applicant: EQUISTAR CHEMICALS, LP, Houston, TX (US)

(72) Inventors: Harilaos Mavridis, Lebanon, OH (US); Roberta Pica, Ferrara (IT); Pietro Baita, Ferrara (IT); Gabriele Mei, Ferrara (IT); Massimo Covezzi, Ferrara (IT)

(73) Assignee: Equistar Chemicals, LP, Houston, TX (US)

( * ) Notice: Subject to any disclaimer, the term of this patent is extended or adjusted under 35 U.S.C. 154(b) by 153 days.

(21) Appl. No.: 15/962,522

(22) Filed: Apr. 25, 2018

(65) Prior Publication Data

US 2018/0319916 A1 Nov. 8, 2018

Related U.S. Application Data

(60) Provisional application No. 62/500,911, filed on May 3, 2017.

(51) Int. Cl.
| | |
|---|---|
| *C08F 210/16* | (2006.01) |
| *C08F 4/22* | (2006.01) |
| *C08F 4/648* | (2006.01) |
| *C08F 4/02* | (2006.01) |
| *C08F 4/642* | (2006.01) |

(52) U.S. Cl.
CPC ............ *C08F 210/16* (2013.01); *C08F 4/022* (2013.01); *C08F 4/648* (2013.01); *C08F 4/6425* (2013.01); *C08F 2500/12* (2013.01)

(58) Field of Classification Search
CPC ...... C08F 210/16; C08F 4/022; C08F 4/6425; C08F 4/648; C08F 2500/12
USPC ...................................................... 526/123.1
See application file for complete search history.

(56) References Cited

U.S. PATENT DOCUMENTS

| | | | |
|---|---|---|---|
| 5,290,745 A * | 3/1994 | Jorgensen | C08F 10/00 502/109 |
| 2012/0202942 A1 | 8/2012 | Mavridis | |

OTHER PUBLICATIONS

International Search Report and Written Opinion dated Aug. 13, 2018 (Aug. 13, 2018) for corresponding PCT/US2018/029397.

\* cited by examiner

*Primary Examiner* — William K Cheung

(57) ABSTRACT

The present disclosure generally relates to ethylene alpha-olefin copolymers and methods of making ethylene alpha-olefin copolymers. The ethylene alpha-olefin copolymers may have a density of about 0.915 g/mL to about 0.918 g/mL, a rheological polydispersity index greater than 0.8, a melt index of about 0.4 dg/10 min to about 2.0 dg/10 min, and/or a CEF $T_{50}$ of 84° C. or less. The ethylene alpha-olefin copolymers may be made by combining an ethylene monomer and one or more alpha-olefin monomers in the presence of a catalyst, such as a Ziegler-Natta catalyst.

20 Claims, 4 Drawing Sheets

ETHYLENE ALPHA-OLEFIN COPOLYMERS AND METHODS

CROSS-REFERENCE TO RELATED APPLICATIONS

This application is the Non-Provisional patent application, which claims benefit of priority to U.S. Provisional Application No. 62/500,911, filed May 3, 2017, the contents of which are incorporated herein by reference in their entirety.

BACKGROUND OF THE INVENTION

This section introduces information that may be related to or provide context for some aspects of the techniques described herein and/or claimed below. This information is background for facilitating a better understanding of that which is disclosed herein. Such background may include a discussion of "related" art.

Ethylene copolymers, such as superhexene linear low density polyethylenes (LLDPE), have many commercial and industrial uses, including packaging applications. Currently, superhexene LLDPE films are made using catalysts and methods in the literature, such as those disclosed at U.S. Pat. No. 5,290,745. When superhexene LLDPE films are made with the catalyst disclosed at U.S. Pat. No. 5,290,745 and a trimethylaluminum co-catalyst, the resulting product exhibits an inverse dependence of film impact on base resin density. As the density decreases, the film impact performance improves.

Maximizing this improvement in performance as the density decreases would be useful in a number of applications. Therefore, ethylene alpha-olefin copolymers, including superhexene LLDPE resins, having an improved balance of impact versus density may be suitable for a number of applications.

SUMMARY OF THE INVENTION

Provided herein are ethylene alpha-olefin copolymers, which may comprise an ethylene monomer and an alpha-olefin monomer. The ethylene alpha-olefin copolymer may have (i) a density of about 0.915 g/mL to about 0.918 g/mL, (ii) a rheological polydispersity index greater than 0.8, (iii) a melt index of about 0.4 dg/10 min to about 2.0 dg/10 min, and (iv) a CEF $T_{50}$ of 84° C. or less. In one embodiment, alpha-olefin monomer comprises one or more $C_3$-$C_{10}$ alpha-olefins. The one or more $C_3$-$C_{10}$ alpha-olefins may comprise a $C_6$ alpha-olefin, such as hex-1-ene, alternatively referred to as 1-hexene.

Also provided herein are methods of producing an ethylene alpha-olefin copolymer. The methods may comprise contacting an ethylene monomer and one or more alpha-olefin monomers in the presence of a Ziegler-Natta (Z-N) catalyst to produce the ethylene alpha-olefin copolymer. The ethylene alpha-olefin copolymer produced by the methods provided herein may have (i) a density of about 0.915 g/mL to about 0.918 g/mL, (ii) a rheological polydispersity index greater than 0.8, (iii) a melt index of about 0.4 dg/10 min to about 2.0 dg/10 min, and (iv) a CEF $T_{50}$ of 84° C. or less. In one embodiment, the Ziegler-Natta catalyst comprises (i) a compound according to formula (I):

$$MR_x \quad (I),$$

wherein M is a transition metal, R is a halogen, an alkoxy, or a hydrocarboxyl group, and x is the valence of the transition metal; and (ii) a co-catalyst; and (iii) an internal donor (ID) comprising a $C_3$-$C_6$ cyclic ether. The transition metal may be selected from Groups IV to VI of the periodic table. In another embodiment, the Ziegler-Natta catalyst comprises (i) Mg; (ii) Ti; (iii) a halogen; (iv) an electron donor compound; and (v) a co-catalyst; wherein the Ziegler-Natta catalyst has (a) a molar ratio Mg to Ti of at least 5:1, (b) a molar ratio of Mg to electron donor of less than 2.1:1, and (c) an X-ray diffraction spectrum comprising at least three 2θ diffraction angle peaks between 5.0° and 20.0°, wherein the at least three 2θ diffraction angle peaks comprise a first 2θ diffraction angle peak of 7.2±0.2°, a second 2θ diffraction angle peak of 11.5±0.2°, and a third 2θ diffraction angle peak of 14.5±0.2°, wherein the second 2θ diffraction angle peak of 11.5±0.2° has an intensity less than 0.9 times the intensity of the first 2θ diffraction angle peak.

DETAILED DESCRIPTION OF THE INVENTION

Figure 1:
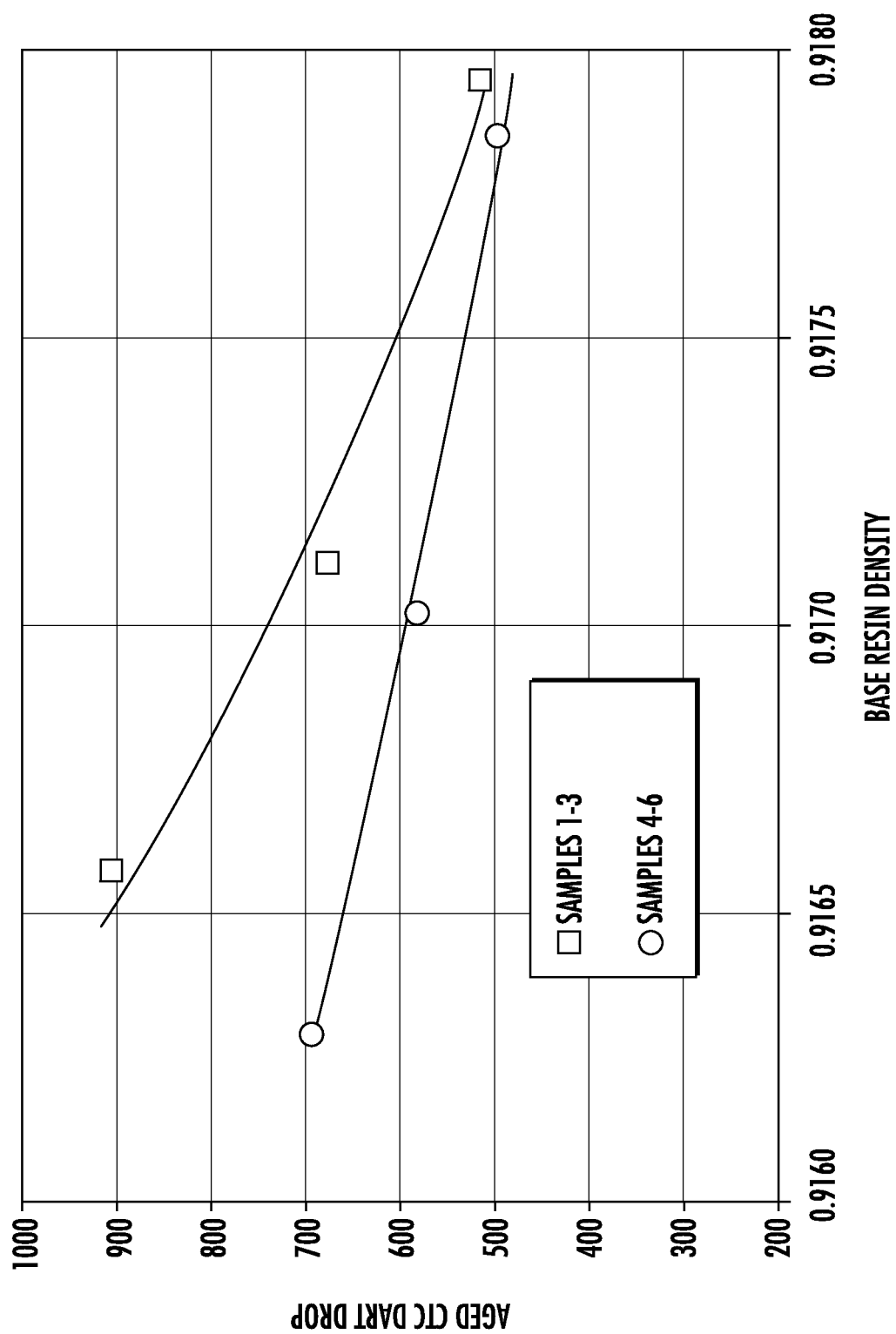
FIG. 1 is a plot of dart drop data versus base resin density for certain embodiments of the ethylene alpha-olefin copolymers provided herein and three comparative compounds.

Provided herein are ethylene alpha-olefin copolymers that, in some embodiments, comprise an improved film impact versus density balance. When compared to ethylene alpha-olefin copolymers formed with a different catalyst, such as a catalyst disclosed at U.S. Pat. No. 5,290,745, the film impact of the ethylene alpha-olefin copolymers provided herein may be at least 20% greater, at least 30% greater, and, in some instances, about 40% to about 50% greater. Accordingly, the film impact of the ethylene alpha-olefin copolymers provided herein at a particular density (such as about 0.9165 g/mL) may be at least 20% greater, and, in some instances, about 40% to about 50% greater, than the film impact of a comparable ethylene alpha-olefin copolymer at the same density.

Illustrative embodiments of the subject matter will now be disclosed. In the interest of clarity, not every feature of an actual implementation is described in this specification. It will be appreciated that in the development of any such actual embodiment, numerous implementation-specific decisions can be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The embodiments disclosed herein may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Further, various ranges and/or numerical limitations may be expressly stated below. It should be recognized that unless stated otherwise, it is intended that endpoints are to be interchangeable. Any ranges include iterative ranges of similar magnitude falling within the expressly stated ranges or limitations disclosed herein are to be understood to set forth every number and range encompassed within the broader range of values. It is to be noted that the terms "range" and "ranging" as used herein generally refer to a value within a specified range and encompass all values within that entire specified range.

Furthermore, various modifications may be made within the scope of the disclosure as herein intended, and embodiments of the disclosure may include combinations of features other than those expressly claimed. For instance, flow arrangements other than those expressly described herein are within the scope of the disclosure.

Various terms as used herein are shown below. To the extent a term used in a claim is not defined below, it should be given the broadest definition skilled persons in the pertinent art have given that term as reflected in printed publications and issued patents at the time of filing. Further, all compounds described herein may be substituted or unsubstituted and the listing of compounds includes derivatives thereof, unless otherwise specified.

Further, various ranges and/or numerical limitations may be expressly stated below. It should be recognized that unless stated otherwise, it is intended that endpoints are to be interchangeable. Further, any ranges include iterative ranges of similar magnitude falling within the expressly stated ranges or limitations.

Ethylene Alpha-Olefin Copolymers

Provided herein are ethylene alpha-olefin copolymers that may comprise an ethylene monomer, and one or more alpha-olefin monomers.

Although the names of the un-polymerized, isolated forms of the monomers are consistently used herein for clarity, it is understood by persons of skill in the art that the monomers have a different structure when polymerized to form the ethylene alpha-olefin copolymers provided herein. For example, when an ethylene alpha-olefin copolymer comprises a hex-1-ene monomer in its structure, the hex-1-ene monomer may have the following structure in the ethylene alpha-olefin copolymer:

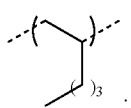

Therefore, the descriptions herein of ethylene alpha-olefin copolymers comprising the various monomers is not to be construed as implying that the monomers retain the structures of their isolated form when a copolymer includes one of the monomers.

In some embodiments, the ethylene monomer is present in the ethylene alpha-olefin copolymers provided herein in an amount of about 75% to about 95% by weight, about 80% to about 95% by weight, or about 85% to about 90% by weight, based on the total weight of the ethylene alpha-olefin copolymer.

In certain embodiments, the one or more alpha-olefin monomers of the ethylene alpha-olefin copolymers herein comprises one or more $C_3$-$C_{10}$ alpha-olefins, one or more $C_3$-$C_8$ alpha-olefins, one or more $C_3$-$C_6$ alpha-olefins, or one or more $C_4$-$C_6$ alpha-olefins. In one embodiment, the alpha-olefin monomer of the ethylene alpha-olefin copolymers herein comprises a $C_3$ alpha-olefin, a $C_4$ alpha-olefin, a $C_6$ alpha-olefin, a $C_8$ alpha-olefin, or a combination thereof. The $C_6$ alpha-olefin may be hex-1-ene. The alpha-olefins of the ethylene alpha-olefin copolymers provided herein may be straight, branched, or a combination thereof.

In some embodiments, the ethylene alpha-olefin copolymers provided herein have a density of about 0.915 g/mL to about 0.918 g/mL, about 0.915 g/mL to about 0.917 g/mL, or about 0.916 g/mL. The density may be measured by ASTM D1505 (Density by Column Gradient), and the specimen prepared for the density measurement may be prepared via the annealed extrudate method (ASTM D2839).

In further embodiments, the ethylene alpha-olefin copolymers provided herein have a rheological polydispersity index (ER) greater than 0.8, or greater than 1.0. The rheological polydispersity parameter, ER, may be measured as described in U.S. Pat. No. 6,171,993. Not wishing to be bound by any particular theory, it is believed that a relatively greater rheological polydispersity can be better for bubble stability in blown films, which can benefit high-speed blown film production.

In some embodiments, the ethylene alpha-olefin copolymers provided herein have a melt index of about 0.4 dg/10 min to about 2.0 dg/10 min, about 0.4 dg/10 min to about 1.0 dg/10 min, or about 0.4 dg/10 min to about 0.7 dg/10 min. The melt index may be determined in accordance with ASTM D-1238 (T=190° C.; Weight=2.16 kg). In a particular embodiment, the ethylene alpha-olefin copolymers have a high load melt index/melt index ratio (HLMI/MI) of greater than 28, greater than 29, or greater than 30.

In additional embodiments, the ethylene alpha-olefin copolymers provided herein have a CEF $T_{50}$ of 84° C. or less, 83.5° C. or less, or 83° C. or less. The CEF $T_{50}$ is the elution temperature at which 50% of the material has eluted when characterized by cumulative crystallization elution fractionation (CEF). In further embodiments, the ethylene alpha-olefin copolymers provided herein have a CEF $T_{50}$ of about 70 to about 84, about 70 to about 83.5, or about 70 to about 83. The CEF $T_{50}$ may be measured according to the procedure of Example 2.

In one embodiment, the ethylene alpha-olefin copolymers provided herein have (i) a density of about 0.915 g/mL to about 0.918 g/mL, (ii) a rheological polydispersity index greater than 0.8, a melt index of about 0.4 dg/10 min to about 2.0 dg/10 min, and a CEF $T_{50}$ of 84° C. or less. This embodiment and other embodiments (Embodiments A-KK) of the ethylene alpha-olefin copolymers are provided in the following table, which indicates the features of each embodiment with an "X":

| Embodi-ment | Density (g/mL) about 0.915 to about 0.918 | Density (g/mL) about 0.915 to about 0.917 | Density (g/mL) about 0.916 | Rheological Polydispersity (ER) >1 | Rheological Polydispersity (ER) >1.1 | Rheological Polydispersity (ER) >1.2 | Melt Index (dg/10 min.) about 0.4 to about 2.0 | Melt Index (dg/10 min.) about 0.4 to about 1.0 | Melt Index (dg/10 min.) about 0.4 to about 0.7 | CEF T$_{50}$ about 70 to about 84 | CEF T$_{50}$ about 70 to about 83.5 | CEF T$_{50}$ about 70 to about 83 |
|---|---|---|---|---|---|---|---|---|---|---|---|---|
| A | X |   |   | X |   |   | X |   |   | X |   |   |
| B |   | X |   | X |   |   | X |   |   | X |   |   |
| C |   |   | X | X |   |   | X |   |   | X |   |   |
| D | X |   |   |   | X |   | X |   |   | X |   |   |
| E | X |   |   |   |   | X | X |   |   | X |   |   |
| F | X |   |   | X |   |   |   | X |   | X |   |   |
| G | X |   |   | X |   |   |   |   | X | X |   |   |
| H | X |   |   | X |   |   | X |   |   |   | X |   |
| I | X |   |   | X |   |   | X |   |   |   |   | X |
| J |   | X |   |   | X |   |   | X |   |   | X |   |
| K | X |   |   |   | X |   |   | X |   |   | X |   |
| L |   |   | X |   | X |   |   | X |   |   | X |   |
| M |   | X |   | X |   |   |   | X |   |   | X |   |
| N |   | X |   |   | X |   |   | X |   |   | X |   |
| O |   | X |   |   | X |   | X |   |   |   | X |   |
| P |   | X |   |   | X |   |   |   | X |   | X |   |
| Q |   | X |   |   | X |   |   | X |   | X |   |   |
| R |   | X |   |   | X |   |   | X |   |   |   | X |
| S |   | X |   |   | X |   |   | X |   |   |   | X |
| T | X |   |   |   | X |   |   | X |   |   |   | X |
| U |   | X |   |   | X |   |   | X |   |   |   | X |
| V |   | X |   | X |   |   |   |   |   | X |   |   |
| W |   | X |   |   | X |   |   |   |   | X |   |   |
| X |   | X |   |   |   | X | X |   |   |   |   | X |
| Y |   | X |   |   |   | X |   | X |   |   |   | X |
| Z |   | X |   |   |   | X |   |   | X | X |   |   |
| AA |   | X |   |   |   | X |   |   | X |   | X |   |
| BB | X |   |   | X |   |   |   | X |   |   | X |   |
| CC | X |   |   | X |   |   |   |   | X |   |   | X |
| DD |   | X |   |   | X |   |   | X |   |   | X |   |
| EE |   | X |   |   | X |   |   |   | X |   |   | X |
| FF |   |   | X |   | X |   |   | X |   |   | X |   |
| GG |   |   | X |   |   | X |   | X |   |   |   | X |
| HH | X |   |   |   | X |   |   | X |   |   |   | X |
| II | X |   |   |   | X |   |   | X |   | X |   |   |
| JJ |   | X |   | X |   |   | X |   |   |   |   | X |
| KK |   | X |   |   | X |   |   |   | X | X |   |   |

In certain embodiments, the ethylene alpha-olefin copolymers provided herein are linear low density polyethylenes (LLDPEs). As used herein, the phrase "linear low density polyethylene" refers to linear low density polyethylene characterized by the absence of long chain branching.

In some embodiments, the ethylene alpha-olefin copolymer is film-shaped. The film-shaped ethylene alpha-olefin copolymer may have a thickness of about 10 μm to about 100 μm, about 15 μm to about 45 μm, about 20 to about 30 μm, or about 25 μm.

The ethylene alpha-olefin copolymers provided herein also may include one or more additives. The one or more additives may impart physical properties, including but not limited to printability, increased gloss, or a reduced blocking tendency. Examples of additives may include, without limitation, stabilizers, ultra-violet screening agents, oxidants, anti-oxidants, anti-static agents, ultraviolet light absorbents, fire retardants, processing oils, mold release agents, coloring agents, pigments/dyes, fillers or combinations thereof, for example. These additives may be included in amounts effective to impart desired properties. In some embodiments, the one or more additives may be added by melt blending.

Catalysts and Catalyst Systems

The ethylene alpha-olefins provided herein may be made by contacting an ethylene monomer and one or more alpha-olefin monomers in the presence of a catalyst and/or catalyst system. The term "catalyst" and phrase "catalyst system" are used interchangeably throughout this disclosure.

Catalyst systems useful for polymerizing olefin monomers may include chromium based catalyst systems, single site transition metal catalyst systems including metallocene catalyst systems, Ziegler-Natta catalyst systems and combinations thereof, for example. The catalysts may be activated for subsequent polymerization and may or may not be associated with a support material, for example. A brief discussion of such catalyst systems is included below, but is in no way intended to limit the scope of the disclosure to such catalysts.

Catalyst systems useful for polymerizing olefin monomers may include Ziegler-Natta catalyst systems, for example. Ziegler-Natta catalysts may be formed from the combination of a metal component (e.g., a potentially active catalyst site) with one or more additional components, such as a catalyst support, a co-catalyst and/or one or more electron donors, for example.

An example of a Ziegler-Natta catalyst includes a metal component represented by the formula:

$$MR_x;$$

where M is a transition metal, R is a halogen, an alkoxy, or a hydrocarboxyl group, and x is the valence of the transition metal. For example, x may be from 1 to 4. The transition metal may be selected from Groups IV to VI of the periodic table.

The transition metal may be selected from Groups IV through VIB (e.g., titanium, chromium or vanadium), for example. R may be selected from chlorine, bromine, carbonate, ester, or an alkoxy group in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with an activator, which is also referred to in some instances as a "co-catalyst". Embodiments of such Z-N activators include organoaluminum compounds, such as trimethylaluminum (TMA), triethylaluminum (TEAL) and triisobutylaluminum (TiBAl), for example. Other activators include diethylaluminum chloride (DEAC).

The Ziegler-Natta catalyst system may further include one or more electron donors, i.e. internal electron donors and/or external electron donors. The internal electron donors may include amines, amides, esters, ketones, nitriles, ethers, thioethers, thioesters, aldehydes, alcoholates, salts, organic acids, phosphines, diethers, succinates, phthalates, malonates, maleic acid derivatives, dialkoxybenzenes and combinations thereof, for example.

In one or more embodiments, the internal donor includes a $C_3$-$C_6$ cyclic ether, or a $C_3$-$C_5$ cyclic ether. For example, the cyclic ethers may be selected from tetrahydrofuran, dioxane, methyltetrahydrofuran and combinations thereof (See, WIPO Pat. App. Pub. No. WO2012/025379, which is incorporated by reference)

The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexylmethyldimethoxysilane (CMDS), diisopropyldimethoxysilane (DIDS) and/or dicyclopentyldimethoxysilane (CPDS), for example. The external donor may be the same or different from the internal electron donor used. However, in one or more embodiments, the catalyst system is absent an external donor.

The components of the Ziegler-Natta catalyst system (e.g., catalyst, activator and/or electron donors) may or may not be associated with a support, either in combination with each other or separate from one another. In one or more embodiments, the Z-N support materials may include a magnesium dihalide, such as magnesium dichloride or magnesium dibromide or silica, for example.

In one or more embodiments, the support may include a magnesium compound represented by the general formula:

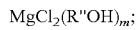

wherein R" is a $C_1$-$C_{10}$ alkyl and m is in a range of 0.5 to 3.

In one or more embodiments, the Ziegler-Natta catalyst system exhibits a molar ratio of support to metal component (measured as the amount of metal of each component) Mg:Ti of greater than 5:1, or in a range of 7:1 to 50:1, or 10:1 to 25:1, for example.

In one or more embodiments, the Ziegler-Natta catalyst system exhibits a molar ratio of support to internal donor Mg:ID of less than 3:1, or less than 2.9:1, or less than 2.6:1, or less than 2.1:1, or less than 2:1, or from 1.1:1 to 1.4:1, for example.

In one or more embodiments, the Ziegler-Natta catalyst system exhibits an X-ray diffraction spectrum in which the range of 2Θ diffraction angles between 5.0° and 20.0°, at least three main diffraction peaks are present at diffraction angles 2Θ of 7.2±0.2°, and 11.5±0.2° and 14.5±0.2°, the peak at 2Θ of 7.2±0.2° being the most intense peak and the peak at 11.5±0.2° having an intensity less than 0.9 times the intensity of the most intense peak.

In one or more embodiments, the intensity of the peak at 11.5° has an intensity less than 0.8 times the intensity of the diffraction peak at 2Θ diffraction angles of 7.2±0.2°. In one or more embodiments, the intensity of the peak at 14.5±0.2° is less than 0.5 times, or less than 0.4 times the intensity of the diffraction peak at 2Θ diffraction angles of 7.2±0.2°.

In one or more embodiments, another diffraction peak is present at diffraction angles 2Θ of 8.2±0.2° having an intensity equal to or lower than the intensity of the diffraction peak at 2Θ diffraction angles of 7.2±0.2°. For example, the intensity of the peak at diffraction angles 2Θ of 8.2±0.2° is less than 0.9, or less than 0.5 times the intensity of the diffraction peak at 2Θ diffraction angles of 7.2±0.2°.

In one or more embodiments, an additional broad peak is observed at diffraction angles 2Θ of 18.2±0.2° having an intensity less than 0.5 times the intensity of the diffraction peak at 2Θ diffraction angles of 7.2±0.2°. The X-ray diffraction spectra are collected by using Bruker D8 advance powder diffractometer.

The Ziegler-Natta catalyst may be formed by any method in the art. For example, the Ziegler-Natta catalyst may be formed by contacting a transition metal halide with a metal alkyl or metal hydride. (See, U.S. Pat. Nos. 4,298,718; 4,298,718; 4,544,717; 4,767,735; and 4,544,717, which are incorporated by reference herein.) The catalyst can be in the form of a solution, a slurry or a dry free flowing powder. The amount of Ziegler-Natta catalyst used is that which is sufficient to allow production of the desired amount of the polyethylene.

Methods

The ethylene alpha-olefin copolymers provided herein may be made by contacting an ethylene monomer and one or more alpha-olefin monomers. The ethylene monomer and one or more alpha-olefin monomers may be contacted in the presence of a catalyst. The catalyst may be a Ziegler-Natta catalyst, such as the Ziegler-Natta catalysts provided herein.

In one embodiment, methods of producing an ethylene alpha-olefin copolymer are provided, which comprise contacting an ethylene monomer and one or more alpha-olefin monomers in the presence of a Ziegler-Natta catalyst to produce the ethylene alpha-olefin copolymer; wherein the ethylene alpha-olefin copolymer has (i) a density of about 0.915 g/mL to about 0.918 g/mL, (ii) a rheological polydispersity index greater than 0.8, (iii) a melt index of about 0.4 dg/10 min to about 2.0 dg/10 min, and (iv) a CEF $T_{50}$ of 84° C. or less. In further embodiments, methods of producing an ethylene alpha-olefin copolymer are provided, which comprise contacting an ethylene monomer and one or more alpha-olefin monomers in the presence of a Ziegler-Natta catalyst to produce the ethylene alpha-olefin copolymer; wherein the ethylene alpha-olefin copolymer has (i) a density, (ii) a rheological polydispersity, (iii) a melt index, and (iv) a CEF $T_{50}$ according to any one of embodiments A-KK.

In certain embodiments, the methods provided herein further comprise forming a film of the ethylene alpha-olefin copolymer. The film may be a blown film. The blown films may be produced on a blown film line equipped with a smooth-bore extruder, barrier screw, and a spiral mandrel die.

In some embodiments, the Ziegler-Natta catalyst used in the methods provided herein comprises (i) a compound according to formula (I):

$$MR_x \qquad (I),$$

wherein M is a transition metal, R is a halogen, an alkoxy, or a hydrocarboxyl group, and x is the valence of the transition metal; (ii) a co-catalyst; and (iii) an internal donor (ID) comprising a $C_3$-$C_6$ cyclic ether. In one embodiment, the co-catalyst comprises one or more organoaluminum compounds, such as those provided herein, which include, but are not limited to, trimethylaluminum (TMA). The Ziegler-Natta catalyst may further comprise a catalyst support, such as those provided herein, which include, but are not limited to, $MgCl_2$. The transition metal may be selected from Groups IV to VI of the periodic table.

In additional embodiments, the Ziegler-Natta catalyst of the methods provided herein comprise (i) Mg; (ii) Ti; (iii) a halogen; (iv) an electron donor compound; and (v) a co-catalyst.

The Ziegler-Natta catalyst, in one embodiment, has a molar ratio Mg to Ti of at least 5:1, at least 7:1, at least 10:1, at least 20:1, at least 30:1, at least 40:1, at least 50:1, at least 60:1, or at least 65:1. In another embodiment, the Ziegler-Natta catalyst has a molar ratio of Mg to Ti of about 5:1 to about 70:1, or about 7:1 to about 70:1.

In one embodiment, the Ziegler-Natta catalyst has a molar ratio of Mg to electron donor of less than 2.1:1, less that 1.8:1, less than 1.5:1, or less than 1.4:1. In another embodiment, the Ziegler-Natta catalyst has a molar ratio of Mg to electron donor of about 1.0:1 to about 2.1:1, about 1.1:1 to about 1.8:1, or about 1.1:1 to about 1.4:1.

In some embodiments, the electron donor is an inner electron donor. In a particular embodiment, the electron donor comprises a cyclic ether having 3 to 6 carbon atoms. In one embodiment, the electron donor compound comprises tetrahydrofuran (THF).

The Ziegler-Natta catalyst, in one embodiment, has a molar ratio Mg to Ti of at least 5:1, a molar ratio of Mg to electron donor of less than 2.1:1, and an X-ray diffraction spectrum comprising at least three 2θ diffraction angle peaks between 5.0° and 20.0°, wherein the at least three 2θ diffraction angle peaks comprise a first 2θ diffraction angle peak of 7.2±0.2°, a second 2θ diffraction angle peak of 11.5±0.2°, and a third 2θ diffraction angle peak of 14.5±0.2°, wherein the first 2θ diffraction angle peak of 7.2±0.2° is the most intense and the second 2θdiffraction angle peak of 11.5±0.2° has an intensity less than 0.9 times the intensity of the first 2θ diffraction angle peak. In other embodiments, the second 2θ diffraction angle peak of 11.5±0.2° has an intensity less than 0.8 times the intensity of the first 2θ diffraction angle peak. In some embodiments, the X-ray diffraction spectrum comprises a fourth 2θ diffraction angle peak of 8.2±0.2° having an intensity less than 0.9 times the intensity of the first 2θ diffraction angle peak. In still further embodiments, the X-ray diffraction spectrum comprise a fifth 2θ diffraction angle peak of 18.2±0.2° having an intensity less than 0.5 times the intensity of the first 2θdiffraction angle peak.

The Ziegler-Natta catalyst, in one embodiment, has a molar ratio Mg to Ti of about 5:1 to about 70:1, a molar ratio of Mg to electron donor of about 1.1:1 to about 1.4:1, and an X-ray diffraction spectrum comprising at least three 2θ diffraction angle peaks between 5.0° and 20.0°, wherein the at least three 2θ diffraction angle peaks comprise a first 2θ diffraction angle peak of 7.2±0.2°, a second 2θ diffraction angle peak of 11.5±0.2°, and a third 2θ diffraction angle peak of 14.5±0.2°, wherein the first 2θ diffraction angle peak of 7.2±0.2° is the most intense and the second 2θ diffraction angle peak of 11.5±0.2° has an intensity less than 0.9 times the intensity of the first 2θ diffraction angle peak. In other embodiments, the second 2θ diffraction angle peak of 11.5±0.2° has an intensity less than 0.8 times the intensity of the first 2θdiffraction angle peak. In some embodiments, the X-ray diffraction spectrum comprises a fourth 2θ diffraction angle peak of 8.2±0.2° having an intensity less than 0.9 times the intensity of the first 2θ diffraction angle peak. In still further embodiments, the X-ray diffraction spectrum comprise a fifth 2θ diffraction angle peak of 18.2±0.2° having an intensity less than 0.5 times the intensity of the first 2θ diffraction angle peak.

The methods provided herein may be a gas-phase polymerization. Gas-phase polymerization may be used for the preparation of polyethylene which can be carried out in a fluidized or stirred, bed reactor in the presence of a catalyst, ethylene, fluidization gas and molecular weight regulator which may consist of hydrogen. Ziegler-Natta catalysts, such as those provided herein, may be used for this type of polymerization. In one embodiment, methods provided herein are performed in a gas-phase fluidized-bed reactor.

In one embodiment, the methods comprise contacting in a liquid hydrocarbon and in the absence of olefins (a) a solid catalyst component comprising Ti, Mg, and Cl, and optionally an internal electron donor compound, and (b) an aluminum alkyl compound. TMA, for example, may be added to the polymerization medium in an amount sufficient to effect production of the desired polyethylene copolymer. In some embodiments, TMA is incorporated in a molar ratio of TMA to transition metal component of the Ziegler-Natta catalyst ranging from about 1:1 to about 100:1. In additional embodiments, the molar ratio of TMA to transition metal component ranges from about 1:1 to about 50:1. The catalyst system formed by the contact of components (a)-(b), can be used directly in the main gas-phase polymerization process.

In certain embodiments, the fluidized bed of polymer particles is kept in a fluidized state in the gas phase by means of an upwardly oriented gaseous stream. The upward velocity of the reaction gas has to be high enough to fluidize the mixed bed of polymer particles and to effectively remove the heat of polymerization.

In some embodiments, a gas distributor plate is placed at the bottom of the fluidized bed of polymer. At the top, the cylindrical part of the reactor may be adjoined by a widening disengagement zone which reduces the discharge of solid particles from the reactor. The reaction gas may leave the reactor at the upper end of the disengagement zone and may be conveyed in the recycle gas line. The recycle gas may be conveyed to the compressor and then to a heat exchanger, in which the recycle gas can be cooled back to the reactor. The recycle gas can, if appropriate, be cooled to below the gas mixture dew point in the heat exchanger so as to operate the fluidized bed reactor in the condensed mode.

Due to the use of an ethylene monomer, the circulated reaction gas (recycle gas) may comprise a mixture of ethylene, and optionally a molecular weight regulator such as hydrogen, propane and/or further saturated hydrocarbons such as ethane, butane and isopentane. In addition, depending on the catalyst, further additives and components such as metal alkyls, antistatics, catalyst poisons, etc., can also be used. Moreover, the reaction gas can further comprise $C_3$-$C_8$-alpha-olefins such as propylene, 1-butene, 1-pentene, 2-methylpentene, 1-hexene, 1-heptene and 1-octene as comonomers. For constant reaction conditions, the constituents of the reaction gas can be fed into the gas-phase fluidized-bed reactor either directly or via the circulated reaction gas.

In additional embodiments, when a gas phase polymerization is used, the amount of hydrogen used, and therefore the pressure ratio $H_2/C_2$, may depend on the type of polyethylene products to be produced, such as from their desired molecular weight expressed in terms of Melt Flow Rate (MFR) as determined according to ASTM-D 1238, Condition E.

Not wishing to be bound by any particular theory, it is believed that the capacity of the gas-phase fluidized-bed reactor is limited by the cooling capacity of the circulated reaction gas. The cooling capacity may be dependent on the heat capacity, i.e. the chemical composition, of the reaction gas and also, inter alia, on the pressure of the reaction gas or at which the (co)polymerization is carried out, for instance at pressures of about 21 barg. The cooling capacity also may depend on the reactor temperature at which the (co)polymerization in the fluidized bed is carried out. In some embodiments, the methods provided herein are performed at a temperature of about 75° C. to about 100° C., including about 86° C.

In further embodiments, the ethylene alpha-olefin copolymers made by the methods provided herein may comprise a defined size, and, depending on the catalyst used, the particles may have a mean size of from a few hundred to a few thousand microns. In one embodiment, the mean particles have a size of about 400 μm to about 700 μm. The particles may be withdrawn from the reactor via one discharge line. The product may be discharged continuously or discontinuously. The mean particle size may be determined by using certified sieves, pouring an amount of the polymer particles on the sieves, "shaking" the sieves for a fixed time, i.e., about 20 minutes, weighing the residual polymer particles on the sieves, and calculating the corresponding percentage of polymer particles.

Once the catalyst is prepared, as described herein or otherwise, a variety of processes may be carried out using that composition to form the ethylene alpha-olefin copolymers. The equipment, process conditions, reactants, additives and other materials used in the methods provided herein will vary in a given process, depending on the desired composition and properties of the product being formed. Such processes may include solution phase, gas phase, slurry phase, bulk phase, high pressure processes and combinations thereof, for example.

The ethylene alpha-olefin copolymers provided herein may be useful in a number of applications, including those that may be useful for conventional polymeric compositions, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact applications. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example. The ethylene alpha-olefin copolymers disclosed herein may be fabricated into other articles of manufacture, such as molded articles, by any technique.

EXAMPLES

The present disclosure is further illustrated by the following examples, which are not to be construed in any way as imposing limitations upon the scope thereof. Other aspects of this disclosure will be apparent to those skilled in the art from consideration of the specification and practice of the technology disclosed herein.

Example 1—Preparation and Analysis of Superhexene LLDPE (Linear Low Density Polyethylene)

Three superhexene LLDPE copolymers were created by contacting ethylene and 1-hexene in the presence of a Ziegler-Natta catalyst that included trimethylaluminum as a co-catalyst (Z260-TMA), and DEAC and THA as catalyst activators. (DEAC/THF=0.45; THA/THF=0.25; and $Al_{total}$/THF of about 2.5 to about 3.5).

For comparison purposes, three superhexene LLDPE copolymers were created using the procedure of this example with the Ziegler-Natta catalyst disclosed in U.S. Pat. No. 5,290,745.

The process conditions used to create Samples 1-3 are provided in the following table:

| Run | | | Samples 1 and 2 | Sample 3 |
|---|---|---|---|---|
| PCP-1 | T | ° C. | 40 | 40 |
| | tau | min | 87 | 87 |
| | THA/THF | mol-ratio | 0.26 | 0.25 |
| PCP-2 | T | ° C. | 40 | 40 |
| | tau | min | 55 | 55 |
| | DEAC/THF | mol-ratio | 0.46 | 0.46 |
| GPR | T | ° C. | 86 | 86 |
| | P | barg | 21 | 21 |
| | tau | h | 1.0 | 1.1 |
| | Teal/THF | mol-ratio | 3.7 | 2.7 |
| | Altot/THF | molar | 4.4 | 3.4 |
| | Condens rate | % wt | ~5 | ~5 |
| | $C_2$ | % mol | 19.7 | 20.3 |
| | $H_2/C_2$ | mol-ratio | 0.08 | 0.11 |
| | $C_6/(C_6 + C_2)$ | mol-ratio | 0.12 | 0.12 |
| | Tot Mileage | kg/g | 8.2 | 7.8 |

The samples were prepared using a gas-phase polymerization process in a gas-phase fluidized-bed reactor.

The copolymers were formed into blown films. The blown films of this example were produced on a blown film line equipped with a 2" diameter smooth-bore extruder, 24:1 L/D barrier screw and a 4" diameter spiral mandrel die with a 0.100" die gap. The blown film fabrication conditions included an output rate of 88 lb/hr, a blow-up ratio of 2.5, a frostline height of 12" and a film thickness of 1 mil (25 microns).

The density, melt index, rheological polydispersity, melting point, ratio of high load melt index/melt index (HLMI/MI), and xylene soluble content (XS) was then determined for each sample, as shown in the following tables.

| | Sample No. | Density (g/mL) | Melt Index (dg/10 min) | Rheological Polydispersity (ER) | $M_w/M_n$ | $T_m$ (° C.) |
|---|---|---|---|---|---|---|
| Inventive Samples | 1 | 0.9166 | 0.54 | 1.12 | 4.9 | 122.7 |
| | 2 | 0.9171 | 0.60 | 1.06 | 5.0 | 122.3 |
| | 3 | 0.9180 | 0.59 | 0.97 | 4.8 | 122.2 |
| Comparative Samples | 4 | 0.9163 | 0.54 | 0.83 | 5.1 | 122.5 |
| | 5 | 0.9170 | 0.56 | 0.88 | 5.0 | 122.5 |
| | 6 | 0.9178 | 0.62 | 0.77 | 5.0 | 122.6 |

| | Sample No. | Mz/Mw | HLMI/MI | Xylene Soluble Content (XS) |
|---|---|---|---|---|
| Inventive Samples | 1 | 3.0 | 28.7 | 13.0 |
| | 2 | 3.0 | 29.9 | 12.4 |
| | 3 | 2.9 | 30.3 | 10.2 |
| Comparative Samples | 4 | 2.9 | 29.0 | 13.6 |
| | 5 | 2.9 | 28.7 | 12.4 |
| | 6 | 2.9 | 28.0 | 11.9 |

The rheological polydispersity parameter, ER, was defined and measured as described in U.S. Pat. No. 6,171,993 (see also Shroff, R. and Mavridis, H. et al. "New Measures of Polydispersity from Rheological Data on Polymer Melts," J. APPL. POLYM. SCI., 57, 1605-1626 (1995).

The resin density was measured by ASTM D1505 (Density by Column Gradient), whereby the specimen that was measured for density was prepared via the annealed extrudate method (ASTM D2839). Samples 1-6 contained talc antiblock (6000 ppm for the examples), as is common in LLDPE film applications. The density measured by the method above was affected by the presence of antiblock. The base resin density, therefore, was back-calculated from the measured density and the talc antiblock amount via the following equation:

Base Resin Density=(Measured Pellet Density)−
6.7·10$^{-7}$*(ppm Antiblock)

Unknown antiblock amounts can be measured on a given pellet sample via the ash test (ASTM D5630).

The xylene soluble content (XS) was measured with FIPA (Flow Injection Polymer Analysis). Sample solutions for this test were prepared by adding 100 mg of resin to 25 ml ortho-xylene in 40 ml vials with Teflon caps and mini-stir bars. The resin was dissolved using a heating/stirring module at 135° C. for 90 min. The solution was then allowed to air cool for 10 minutes, and then placed in a thermostatic water bath at 25° C. for 30 min. Cooled samples were filtered through 30 mm, 0.2 μm, and 5.0 μm Nylon syringe filters connected in series directly into a conventional 1.5 ml HPLC vial. A FIPA test of this sample solution was performed in a Viscotek GPC Max (Malvern Instrument) with the data process software OmniSec™ v.4.6.1-354. The instrument itself included two modules. The first module was the VE 2001 GPC solvent/sample module which pumped the solvent, housed the sample vials, and injected the sample solutions. The second module was the TDA 305 detector array which housed a column and the detector(s). XS was determined by a refractometer which provided a signal believed to be proportional to the concentration of the sample as it eluted from the column. The instrument was operated at a temperature of 45° C. with a flow rate of 1 ml/min. The mobile phase was THF with 0.025% BHT added.

A dart drop test was performed to determine the films' impact versus density balance. Specifically, the film impact strength was characterized via the dart drop method, ASTM D1709. Due to the fact that superhexene films can exhibit an "aging effect", with the measured film dart drop decreasing from the time of film fabrication, an "Aged Dart Drop" technique was used to effect an "accelerated aging", as described by H. Mavridis, "Effect of Aging on Film Properties of Ethylene-Alpha-Olefin Copolymers," J. Plastic Film & Sheeting, 18, 259-268 (2002). The accelerated aging technique included a 4-hour aging of the film at 50° C., prior to dart drop testing, as described in the Mavridis publication.

The results of the dart drop test are depicted in the following table, and a plot of the data is provided at FIG. 1.

| | Sample No. | Density (g/mL) | Impact Failure Weight (g) |
|---|---|---|---|
| Inventive Samples | 1 | 0.9166 | 905 |
| | 2 | 0.9171 | 675 |
| | 3 | 0.9180 | 515 |
| Comparative Samples | 4 | 0.9163 | 695 |
| | 5 | 0.9170 | 580 |
| | 6 | 0.9178 | 497 |

The plot of FIG. 1 demonstrates that the film impact versus density balance of the inventive samples was surprisingly better than those of the comparative samples. The inventive samples, Samples 1-3, had a higher impact at the same density, including in the range of densities of about 0.916 g/mL to about 0.917 g/mL, which an operative range of densities in superhexenes.

While not wishing to be bound by any particular theory, it was believed that the improved performance of the inventive samples may have been due to improved comonomer distribution in (Inventive) Samples 1-3, as compared to (Comparative) Samples 4-6. It was believed that this feature could be characterized by crystallization elution fractionation (CEF), as provided in Example 2.

Example 2—Crystallization Elution Fractionation

The crystallization elution fractionation was determined and analyzed for each of the samples of Example 1.

Figure 2:
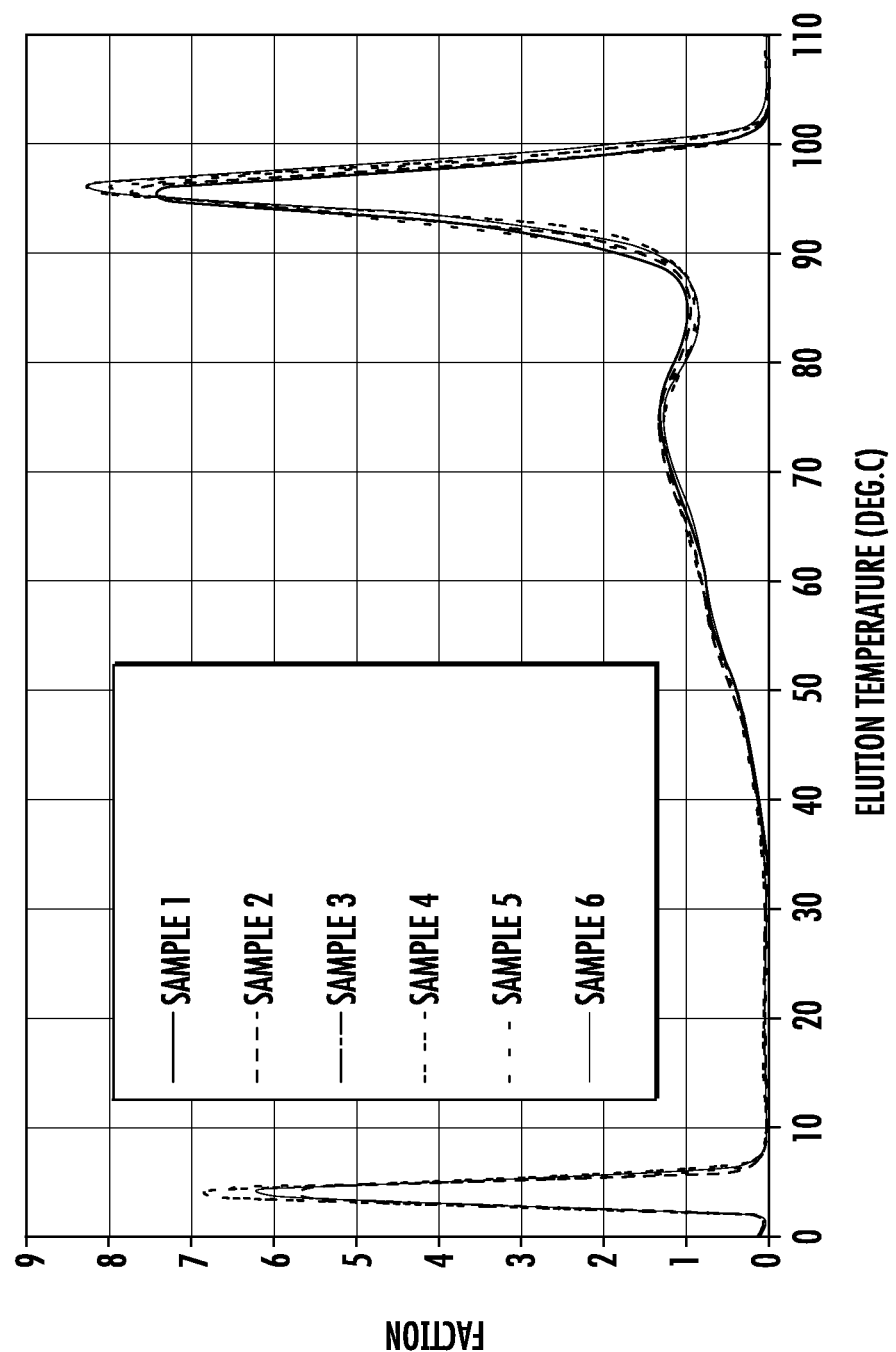
FIG. 2 is a plot of crystallization elution fractionation data collected for certain embodiments of the ethylene alpha-olefin copolymers provided herein and three comparative compounds.

A plot of the fraction versus the elution temperature is depicted at FIG. 2. FIG. 2 compares the CEF of Samples 1-3 with those of Samples 4-6, and each plot included a "high-density" peak at about 90-105° C., and a second, shallower peak at about 70-90° C. It was believed that the "high-density" peak corresponded to higher molecular weight and lower comonomer content fraction, i.e., it was a manifestation of the heterogeneity in comonomer distribution that may be observed in LLDPE resins. FIG. 2, however, demonstrates that the heterogeneity of Samples 1-3 was surprisingly of a lesser magnitude than that of Samples 4-6.

This conclusion was based on the smaller "high-density" peak observed for Samples 1-3, and the more pronounced "shoulder" in the "middle peak" region of about 70-90° C. observed for Samples 1-3. In other words, the differences between the CEF plots of Samples 1-3 and Samples 4-6 of FIG. 2 were believed to indicate a lower comonomer heterogeneity in Samples 1-3, because as Samples 1-3 appeared to have [1] more material in the "middle peak," and [2] less material in the "high-density" peak than Samples 4-6. The lower comonomer heterogeneity, in turn, was believed to cause, in whole or in part, the better film strength properties, such as film impact.

Figure 3:
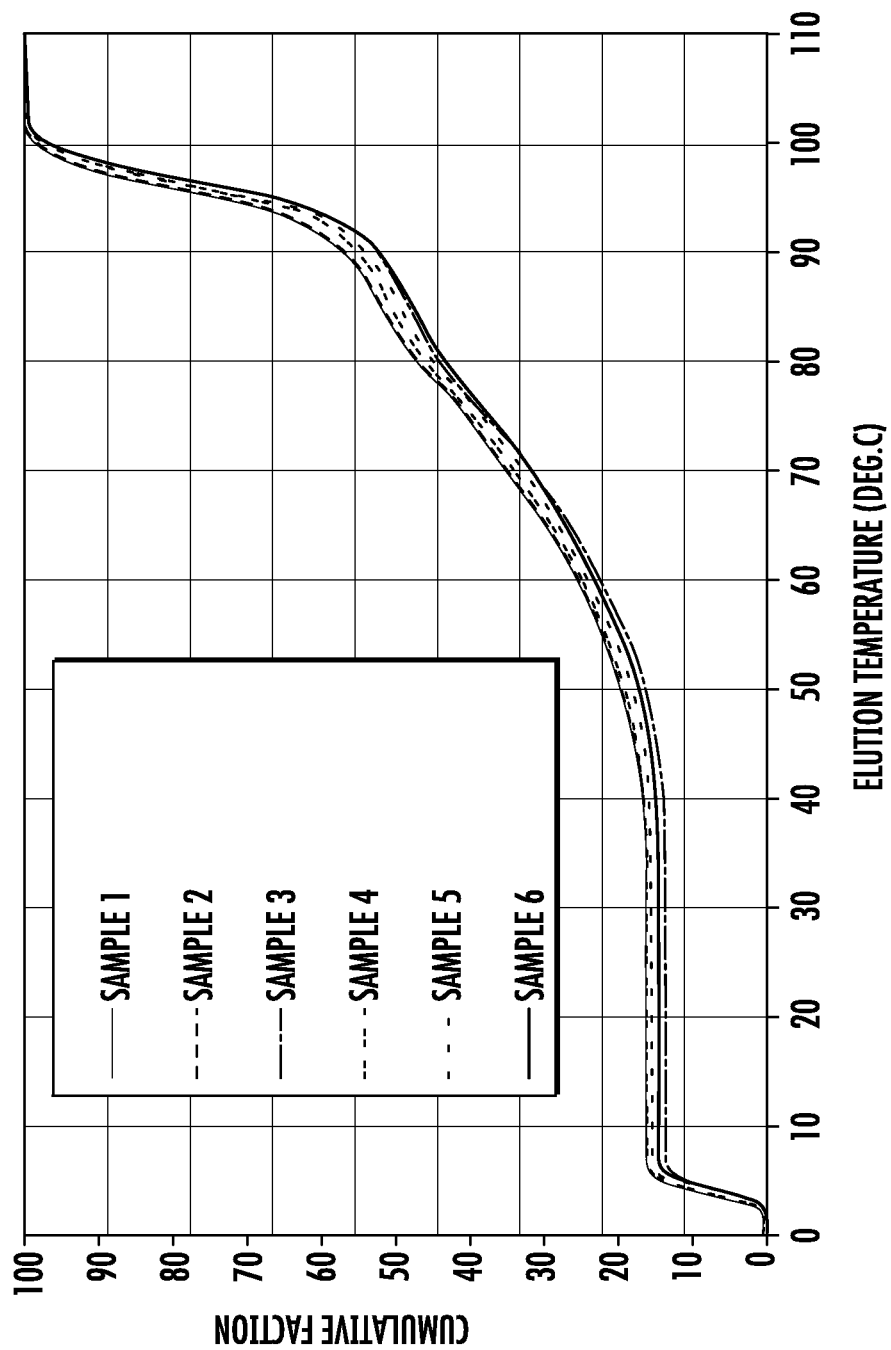
FIG. 3 is a plot of cumulative crystallization elution fractionation data collected for certain embodiments of the ethylene alpha-olefin copolymers provided herein and three comparative compounds.

In order to quantify the foregoing surprising differences between Samples 1-3 and Samples 4-6, the cumulative CEF was determined. A plot of the cumulative fraction versus elution temperature is depicted at FIG. 3. As shown at FIG. 3, the cumulative CEF curves for Samples 1-3 showed elution temperatures that were lower than those observed for Samples 4-6.

From the cumulative crystallization elution fractionation data, the CEF-$T_{50}$ was determined, along with the CEF % at <35° C., the CEF % at <90° C., and the CEF % at 35-90° C. The CEF-$T_{50}$ was the median elution temperature, or, in other words, the elution temperature at which 50% of the material eluted.

|  | Sample No. | CEF-$T_{50}$ (° C.) | CEF % at <35° C. | CEF % at <90° C. | CEF % at 35-90° C. |
|---|---|---|---|---|---|
| Inventive Samples | 1 | 82.9 | 16.3 | 58.0 | 41.7 |
|  | 2 | 82.9 | 16.2 | 57.7 | 41.5 |
|  | 3 | 85.1 | 13.6 | 56.0 | 42.4 |
| Comparative Samples | 4 | 84.3 | 16.1 | 55.7 | 39.5 |
|  | 5 | 85.3 | 15.4 | 54.8 | 39.4 |
|  | 6 | 87.1 | 14.6 | 53.2 | 38.6 |

Figure 4:
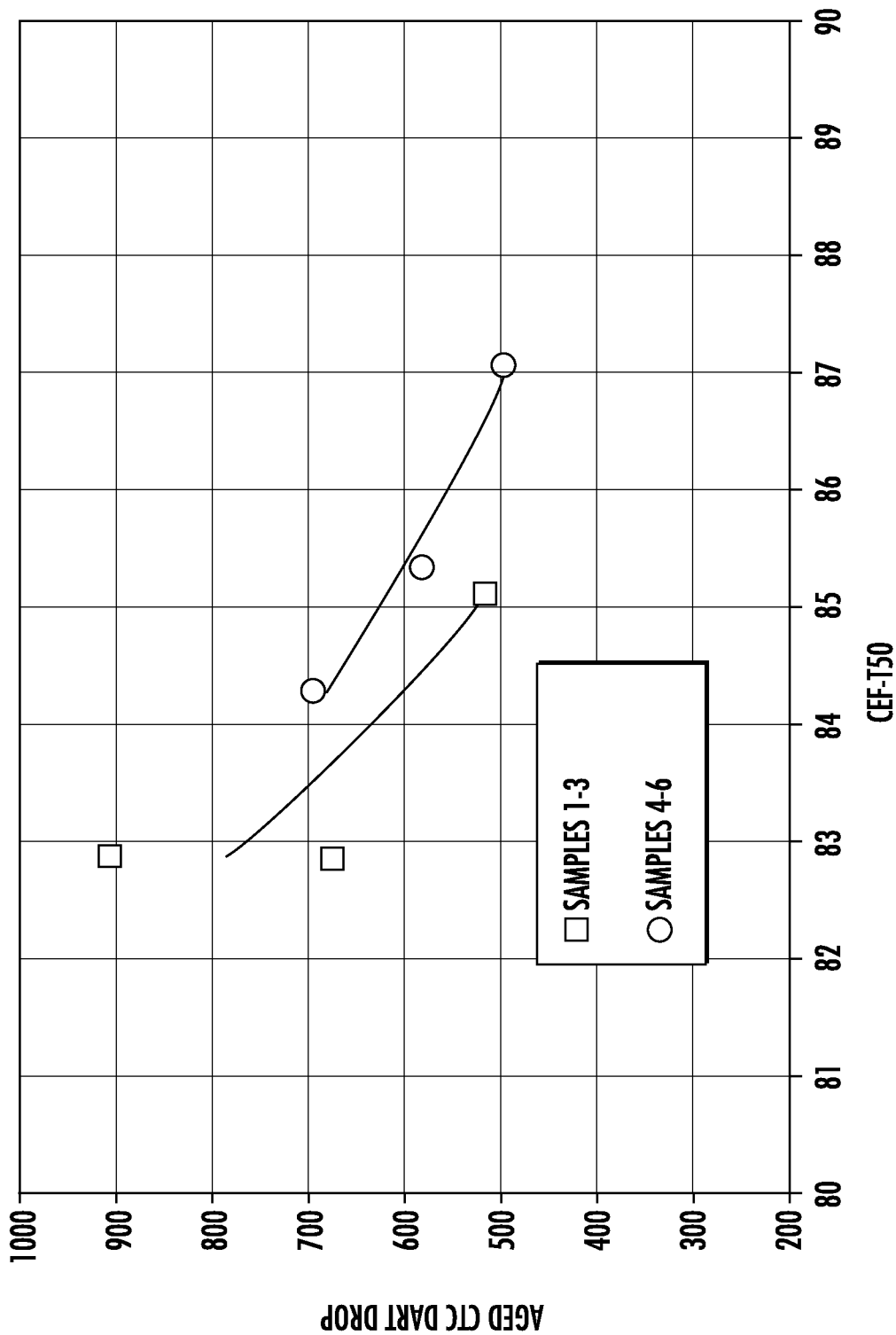
FIG. 4 is a plot of the aged dart drop data versus the CEF-$T_{50}$ for certain embodiments of the ethylene alpha-olefin copolymers provided herein, and three comparative compounds.

A plot of the aged dart drop data (Aged DDI) versus the CEF-$T_{50}$ is depicted at FIG. 4, and provided at the following table:

|  | Sample No. | CEF-$T_{50}$ (° C.) | Aged DDI |
|---|---|---|---|
| Inventive Samples | 1 | 82.9 | 905 |
|  | 2 | 82.9 | 675 |
|  | 3 | 85.1 | 515 |
| Comparative Samples | 4 | 84.3 | 695 |
|  | 5 | 85.3 | 580 |
|  | 6 | 87.1 | 497 |

The CEF data was collected with a Polymer Char Crystallization Elution Fractionation (CEF) instrument designed to separate small molecules by their differences in crystallinity, and obtain the Chemical Composition Distribution (CCD) of the polymers. The instrument had three major parts: an autosampler, column, and detectors. The samples were weighted inside disposable glass vials, which were then placed into the autosampler. The autosampler, with instrumentation software, controlled the full sampling process, including solvent filling, dissolution, column loading, and temperature cycles. The solvent used in this operation was 1,2,4-trichlorobenzene (TCB). The dissolution temperature was set at 160° C. With the help of the Valco valve and a dispenser, the sample solution was injected from the vial into the CEF column where the polymer was separated in two steps according to its crystallinity. A first separation took place in the crystallization cycle due to the decrease of temperature and the continuous flow and only within the limits of the column. A second separation took place in the elution cycle due to the increase of temperature and the continuous flow that allowed the sample to arrive at the detection system. The CEF profile represented as 2-4-1 denoted the operation conditions as a cooling rate (2° C./min); a heating rate during elution (4° C./min), and a flow rate during elution (1 ml/min). The instrument was equipped with 3 detectors: an IR detector for concentration/composition, a light scattering detector for MW, and an IV detector. The detectors were operated at 160° C. A typical CEF trace was constructed with concentration differential vs. elution temperature data, which could be overlaid with a corresponding composition, MW, and IV data set.

What is claimed is:

1. An ethylene alpha-olefin copolymer comprising:
   an ethylene monomer; and
   an alpha-olefin monomer;
   wherein the ethylene alpha-olefin copolymer comprises—
   (i) a density of about 0.915 g/mL to about 0.918 g/mL,
   (ii) a rheological polydispersity index greater than 0.8,
   (iii) a melt index of about 0.4 dg/10 min to about 2.0 dg/10 min, and
   (iv) a CEF $T_{50}$ of 84° C. or less.

2. The ethylene alpha-olefin copolymer of claim 1, wherein the alpha-olefin monomer comprises one or more $C_3$-$C_{10}$ alpha-olefins.

3. The ethylene alpha-olefin copolymer of claim 2, wherein the alpha-olefin monomer comprises a $C_6$ alpha-olefin.

4. The ethylene alpha-olefin copolymer of claim 3, wherein the $C_6$ alpha-olefin comprises hex-1-ene.

5. The ethylene alpha-olefin copolymer of claim 1, wherein the ethylene alpha-olefin copolymer has a density of about 0.915 g/mL to about 0.917 g/mL.

6. The ethylene alpha-olefin copolymer of claim 1, wherein the ethylene alpha-olefin copolymer has a density of about 0.916 g/mL.

7. The ethylene alpha-olefin copolymer of claim 1, wherein the ethylene alpha-olefin copolymer has a melt index of about 0.4 dg/10 min to about 1.0 dg/10 min.

8. The ethylene alpha-olefin copolymer of claim 1, wherein the ethylene alpha-olefin copolymer is film-shaped.

9. A method of producing an ethylene alpha-olefin copolymer comprising:
   contacting an ethylene monomer and one or more alpha-olefin monomers in the presence of a Ziegler-Natta catalyst to produce the ethylene alpha-olefin copolymer;
   wherein the ethylene alpha-olefin copolymer has—
   (i) a density of about 0.915 g/mL to about 0.918 g/mL,
   (ii) a rheological polydispersity index greater than 0.8,
   (iii) a melt index of about 0.4 dg/10 min to about 2.0 dg/10 min, and
   (iv) a CEF $T_{50}$ of 84° C. or less.

10. The method of claim 9, further comprising forming a blown film of the ethylene alpha-olefin copolymer.

11. The method of claim 9, wherein the Ziegler-Natta catalyst comprises:
   (i) a compound according to the formula (I)—

$$MR_x \qquad (I),$$

wherein M is a transition metal of Groups IV to VI of the periodic table, R is a halogen, an alkoxy, or a hydrocarboxyl group, and x is the valence of the transition metal;
   (ii) a co-catalyst; and
   (iii) an internal donor (ID) comprising a $C_3$-$C_6$ cyclic ether.

12. The method of claim 11, wherein the co-catalyst comprises one or more organoaluminum compounds.

13. The method of claim 12, wherein the co-catalyst comprises trimethylaluminum (TMA).

14. The method of claim 11, wherein the Ziegler-Natta catalyst further comprises a catalyst support.

15. The method of claim 14, wherein the catalyst support comprises $MgCl_2$.

16. The method of claim 9, wherein the Ziegler-Natta catalyst comprises:
(i) Mg;
(ii) Ti;
(iii) a halogen;
(iv) an electron donor compound; and
(v) a co-catalyst;
wherein the Ziegler-Natta catalyst has—
(a) a molar ratio Mg to Ti of at least 5:1,
(b) a molar ratio of Mg to electron donor of less than 2.1:1, and
(c) an X-ray diffraction spectrum comprising at least three 2θ diffraction angle peaks between 5.0° and 20.0°, wherein the at least three 2θ diffraction angle peaks comprise a first 2θ diffraction angle peak of 7.2±0.2°, a second 2θ diffraction angle peak of 11.5±0.2°, and a third 2θ diffraction angle peak of 14.5±0.2°, wherein the first 2θ diffraction angle peak of 7.2±0.2° is the most intense and the second 2θ diffraction angle peak of 11.5±0.2° has an intensity less than 0.9 times the intensity of the first 2θ diffraction angle peak.

17. The method of claim 16, wherein the molar ratio of Mg to electron donor is about 1.1:1 to about 1.4:1.

18. The method of claim 16, wherein the co-catalyst comprises one or more organoaluminum compounds.

19. The method of claim 18, wherein the co-catalyst comprises trimethylaluminum (TMA).

20. The method of claim 16, wherein the electron donor is an inner electron donor.

* * * * *